United States Patent [19]

Smith et al.

[11] Patent Number: 5,241,114

[45] Date of Patent: Aug. 31, 1993

[54] METHOD AND SYSTEM FOR EXTENDING CATALYST USEFUL LIFE

[75] Inventors: Thomas G. Smith, Naperville; Owen H. Bailey, West Chicago; Gary P. Hagen, Glen Ellyn, all of Ill.

[73] Assignee: Amoco Corporation, Chicago, Ill.

[21] Appl. No.: 919,784

[22] Filed: Oct. 16, 1986

Related U.S. Application Data

[63] Continuation-in-part of Ser. No. 946,986, Dec. 29, 1986, Pat. No. 4,943,659, which is a continuation of Ser. No. 785,326, Oct. 7, 1985, abandoned, which is a continuation of Ser. No. 632,018, Jul. 18, 1984, abandoned, which is a continuation of Ser. No. 412,914, Aug. 30, 1982, abandoned.

[51] Int. Cl.$^5$ .............................................. C07B 35/00
[52] U.S. Cl. ...................................................... 562/599
[58] Field of Search ......................................... 562/599

[56] References Cited

U.S. PATENT DOCUMENTS

| | | | |
|---|---|---|---|
| 3,089,902 | 5/1963 | Vitcha et al. | 560/210 |
| 3,440,276 | 4/1969 | Wolf et al. | 560/210 |
| 4,631,264 | 12/1986 | Hagen | 502/243 |

*Primary Examiner*—Jose G. Dees
*Assistant Examiner*—Joseph M. Conrad, III
*Attorney, Agent, or Firm*—James R. Henes; Thomas E. Nemo; Wallace L. Oliver

[57] ABSTRACT

A method and a system for extending useful life of a basic catalyst are disclosed. The basic catalyst comprises a particulate, porous, siliceous catalyst support and an alkali metal in the +1 oxidation state on the catalyst support surface. The catalyst is suitable for the synthesis of an alpha, beta-ethylenically unsaturated carboxylic acid by condensation of a saturated carboxylic acid with formaldehyde. The method of the present invention contemplates providing a reactor, or a series of reactors, containing the basic catalyst and a confined source of the alkali metal associated with a suitable carrier, upstream of the reactor or reactors. A feed stream to the reactor is passed first through the confined source and thereafter through the reactor while reaction conditions for the condensation reaction are maintained within the reactor. The temperature of the feed stream passing through the confined source can be modulated to control release of the alkali metal from the carrier. Alkali metal released from the carrier is entrained into the feed stream passing through the confined source and is deposited onto the support in the reactor as the feed stream is passed through the reactor. Feed stream flow through the reactor or reactors can be reversed and/or interchanged as long as the confined alkali metal source remains upstream of one or more of the reactors, i.e., the upstream-most of the reactors in a series of staged reactors can function as the confined alkali metal source as well.

14 Claims, 6 Drawing Sheets

METHOD AND SYSTEM FOR EXTENDING CATALYST USEFUL LIFE

This case is also a continuation-in-part of U.S. Ser. No. 946,986, filed Dec. 29, 1986, now U.S. Pat. No. 4,943,659, which is a continuation of U.S. Ser. No. 785,326, filed Oct. 7, 1985 and now abandoned, which is a continuation of U.S. Ser. No. 632,018, filed Jul. 18, 1984 and now abandoned, which is a continuation of U.S. Ser. No. 412,914, filed Aug. 30, 1982, now abandoned.

TECHNICAL FIELD OF THE INVENTION

The present invention relates to the synthesis of an unsaturated carboxylic acid by the condensation of a saturated carboxylic acid with formaldehyde in the presence of a catalyst. More particularly, the present invention is directed to a method and a system for extending the life of the catalyst used to synthesize the unsaturated carboxylic acid.

BACKGROUND OF THE INVENTION

A saturated carboxylic acid, such as propionic acid (PA), can be catalytically reacted with formaldehyde (FA), in the vapor phase, to produce an alpha, beta-ethylenically unsaturated carboxylic acid, such as methacrylic acid (MA), and water. Catalysts to effect such reactions are well known in the art. See, e.g., U.S. Pat. No. 3,247,248 to Sims et al. Such catalysts typically comprise a catalyst support and a catalytically-active ingredient on the support. The produced unsaturated carboxylic acid can be esterified to a commercially useful unsaturated carboxylic acid ester, such as methyl methacrylate (MMA).

MMA is a widely-used monomer. Illustrative of the many products that can be made from MMA-derived polymers are advertising displays, lighting fixtures, glazing materials, structural panels, and the like, molding resins for automobile tail-light lenses, plumbing fixtures, and the like, as well as constituents of a variety of surface coatings, adhesives, inks, floor polishes, and the like.

Many of the vapor-phase MA-synthesis catalysts that are commercially available tend to deactivate with use over time and accordingly must either be regenerated or replaced. In some instances, the catalyst support is depleted of its catalytically-active ingredient, and this depletion results in the catalyst being progressively less active over time. In a commercial production environment, a deactivated catalyst is typically replaced with fresh catalyst when its performance drops below a desired catalyst activity, conversion or selectivity value.

It can be appreciated that the replacement of the deactivated catalyst may involve unscheduled process downtime, which is undesirable and can be costly. Other systems for regenerating or replacing deactivated catalyst can involve investment in auxiliary processing equipment, which also can be costly. The present invention not only provides a method for extending useful life of the catalyst but also provides a method for replenishing the catalytically-active ingredient of a catalyst as well.

SUMMARY OF THE INVENTION

The present invention contemplates a method for replenishing the activity of a particulate basic catalyst in a reactor, or a series of reactors, for producing an alpha, beta-ethylenically unsaturated carboxylic acid. The basic catalyst is constituted by an alkali metal in the +1 oxidation state and a porous, siliceous support therefor.

The method of the present invention contemplates providing a reactor or reactors containing the basic catalyst in particulate form, and subjecting the reactor contents to preselected condensation reaction conditions to produce the desired unsaturated carboxylic acid via vapor-phase condensation of a saturated carboxylic acid with formaldehyde while providing a confined source of the alkali metal associated with a suitable carrier upstream of the reactor. The alkali metal source can be a separate particulate bed or the upstream-most stage or reactor in a series of plural reactors. The reactor or reactors preferably are operated adiabatically, but can also be operated successfully in other temperature modes, such as isothermal.

A reaction feed stream including the saturated carboxylic acid, the formaldehyde, or both, is passed first through the alkali metal source and thereafter through the reactor while the condensation reaction conditions in the reactor are maintained. The temperature of the feed stream passing through the alkali metal source can be modulated to regulate the rate at which the alkali metal enters the feed stream. That is, at least a portion of the alkali metal can be entrained, at a desired rate, into the feed stream passing through the confined source. The feed stream-entrained alkali metal is then passed through the reactor. As the feed stream passes through the reactor, at least a portion of the entrained alkali metal is deposited onto the catalyst support material that is contained in the reactor or additional reactors downstream.

Figure 1:
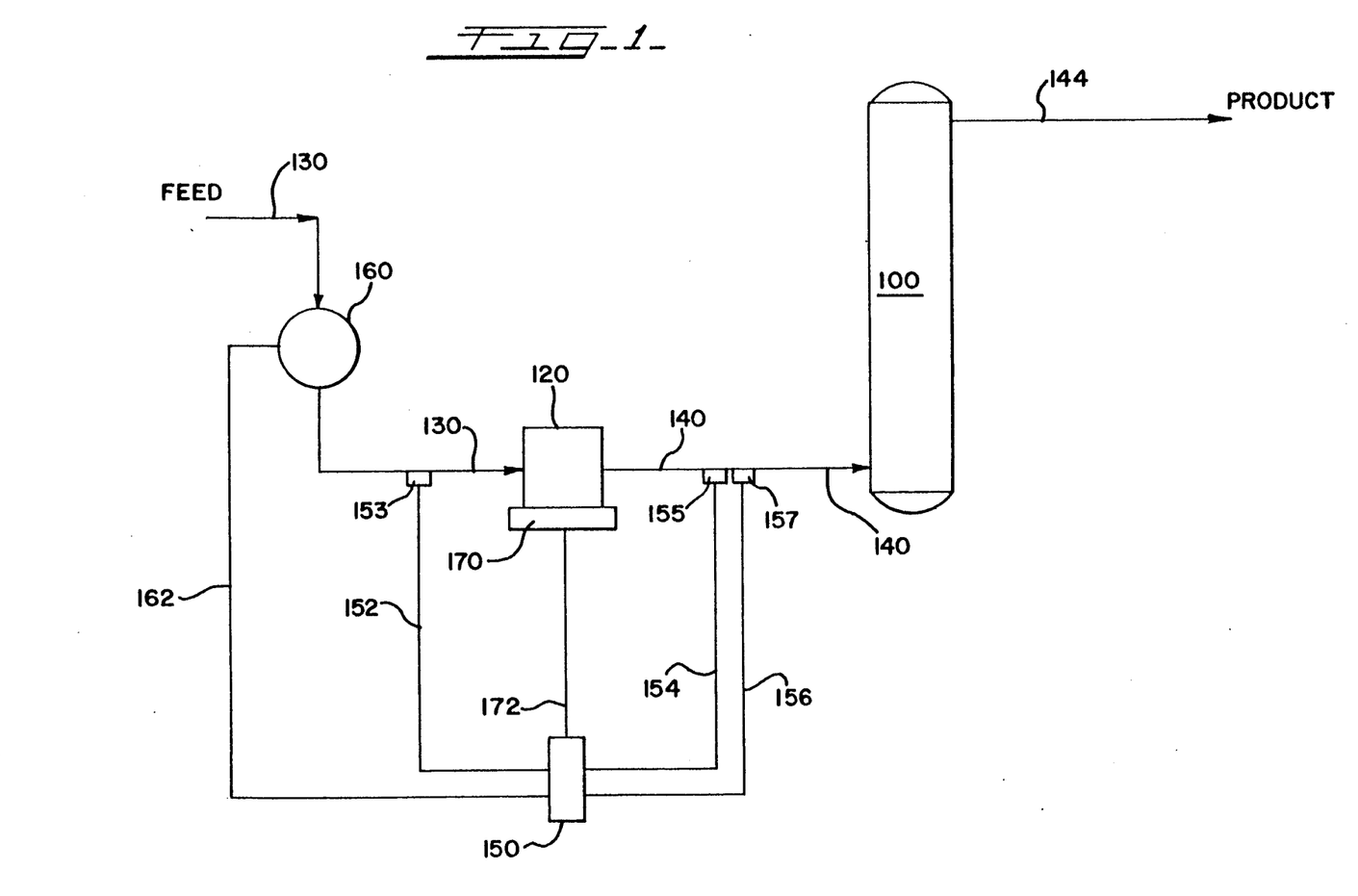
FIG. 1 is a schematic representation of a system embodying the principles of the present invention.
Figure 2:
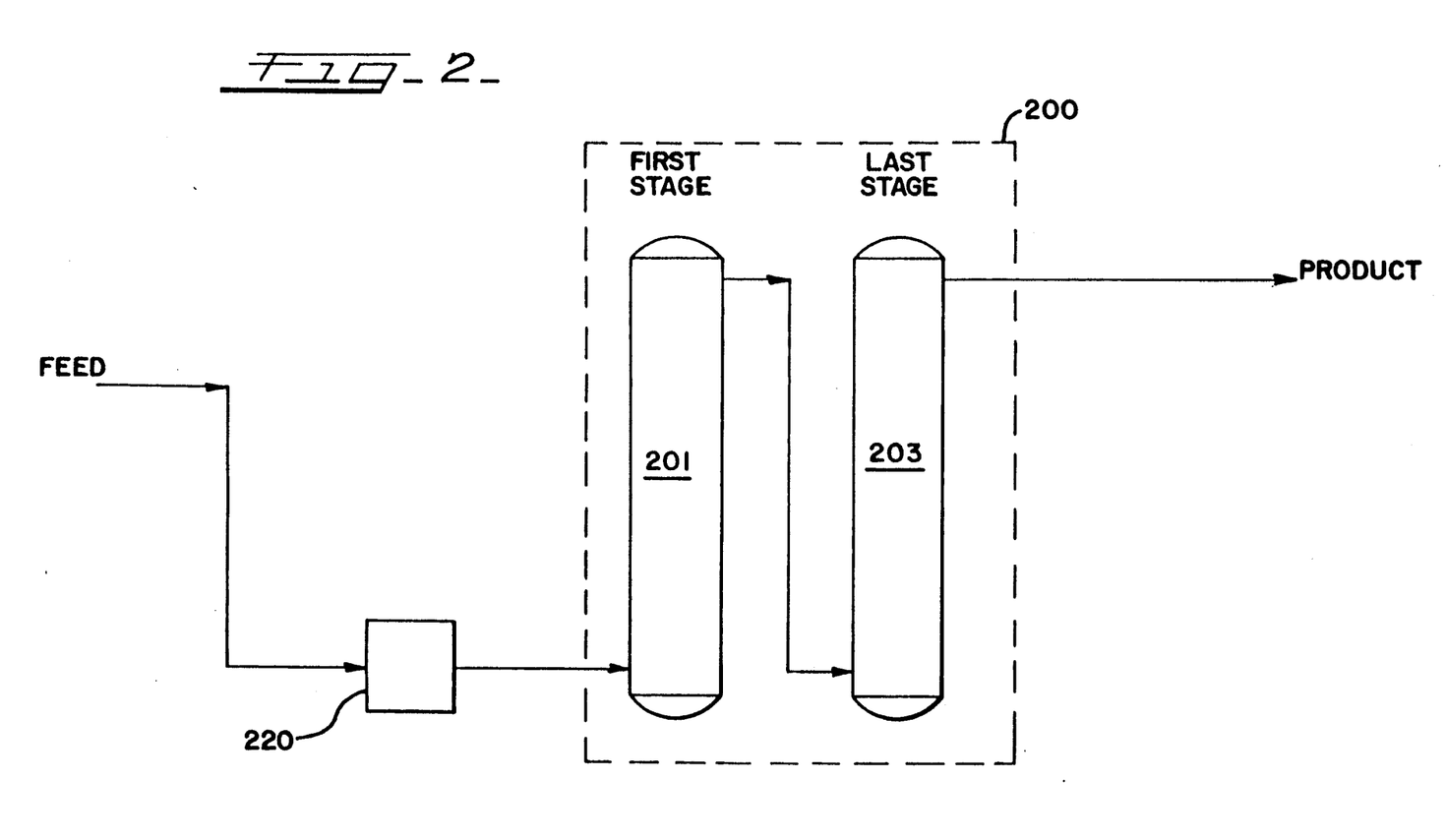
FIG. 2 is a schematic representation of another embodiment of a system embodying the principles of the present invention.

Throughout the drawings, like reference numerals are used to refer to like parts, and different systems are identified by different three-digit series of numerals. In particular, parts or components that are the same or similar among the several systems are referred to by numerals having the same last two digits. That is, like components identified by reference numerals of the 100 series in FIG. 1 are identified by reference numerals of the 200 series in FIG. 2. Likewise, some of the system components identified by reference numerals of the 200 series in FIG. 2 are identified by reference numerals of the 300 series in FIG. 3 or by reference numerals of the 400 series in FIGS. 4a through 4i.

DETAILED DESCRIPTION OF ILLUSTRATED EMBODIMENTS

While the present invention is susceptible to embodiment in various forms, there are shown in the accompanying drawings, and hereinafter described in detail, a number of systems embodying the principles of the present invention. The present disclosure, therefore, is to be considered as an exemplification of the present invention without limitation to the specific embodiments illustrated.

In the ensuing detailed description, certain terms will be utilized for purposes of conciseness and to otherwise elucidate the features and advantages of the present invention. These terms are defined hereinbelow.

The term "activity" as herein used in connection with activity of a catalyst means the relative ease or difficulty of the catalyst to effect chemical conversion of the reactant or reactants to the desired product or products, at a given temperature.

The term "adiabatic" as used herein means that there is substantially no heat interchange between the reaction vessel or reactor and its surrounding environment. In practice, a radial temperature difference of about 3 to about 5° F. (about 1.7° to about 2.8° C.) can be present in such a reactor. However, such a radial temperature difference has not been observed to be significant; and each such reactor exhibiting such a radial temperature difference is deemed to be operating at substantially adiabatic conditions.

The term "basic catalyst" as herein used comprises a siliceous support and alkali-metal ions in the +1 oxidation state on the support.

The term "colloid" as used herein means a suspension of finely divided particles that do not settle out of, and cannot be readily filtered from, the medium in which they are suspended.

The term "colloidal silica" as used herein describes a dispersion of typically millimicron-size $SiO_2$ particles in an aqueous or organic solvent. Colloidal silica is also sometimes referred to as "silica sol." An illustrative silica sol is one commercially available from the Nalco Chemical Company, Oakbrook, Ill. 60521, under the designation Nalco 1034-A silica sol. Nalco 1034-A silica sol has a silica concentration of about 34 weight percent, based on the weight of the silica sol, a mean silica particle size of about 20 nanometers, a pH of about 3.2, a viscosity of about 10 centipoises, and a $Na_2O$ content of less than about 0.05 wt. %, based on the weight of the silica sol.

The term "silica gel" as used herein describes a coherent, rigid, continuous three-dimensional matrix or structure of generally spherical particles of silica.

The term "WHSV" as used herein means weight hourly space velocity, and is expressed as grams of feed per gram of catalyst per hour.

Additional definitions include the following equations.

Yield (Y), based on propionic acid:

$$\% Y (PA) = \frac{\text{moles of MA produced}}{\text{moles of PA in feed}} \times 100$$

Yield (Y), based on formaldehyde:

$$\% Y (FA) = \frac{\text{moles of MA produced}}{\text{moles of FA in feed}} \times 100$$

Methacrylic acid selectivity (S), based on propionic acid:

$$\% S (PA) = \frac{\text{moles of MA produced}}{\text{moles of PA reacted}} \times 100$$

Methacrylic acid selectivity (S), based on formaldehyde:

$$\% S (FA) = \frac{\text{moles of MA produced}}{\text{moles of FA reacted}} \times 100$$

Conversion (C):

$$\% C = \frac{\% Y}{\% S} \times 100$$

Referring to FIG. 1, a system which can be utilized to catalytically synthesize an unsaturated carboxylic acid by condensing a saturated carboxylic acid with formaldehyde in the presence of a basic catalyst is shown schematically. The illustrated system is especially well-suited for vapor-phase condensation of propionic acid (PA) with formaldehyde (FA) to produce methacrylic acid (MA). The catalyst support is particulate and siliceous, and preferably is silica gel. The alkali metal present on the catalyst support surface preferably is cesium.

The illustrated system comprises a reaction vessel or reactor 100 containing the basic catalyst in particulate form. Located upstream of reactor 100 is a confined alkali metal source 120, adapted to provide the reactor with a replenishing amount of alkali metal for deposit on the reactor-contained catalyst support surface. Reactor 100 can be operated at predetermined condensation reaction conditions to synthesize a desired unsaturated carboxylic acid such as methacrylic acid.

The confined, alkali metal-providing source 120 contains the alkali metal on a suitable, relatively inert substrate or carrier, which can be the same as or different from the reactor-contained catalyst support mentioned above.

A feed stream containing the desired condensation reactants is first passed through the alkali metal source 120, and is thereafter passed through the reactor 100 while the desired condensation reaction conditions are maintained in the reactor 100. When the illustrated system is utilized to synthesize MA, for example, the feed stream to reactor 100 preferably contains both PA and FA. In particular, the feed stream preferably contains PA/FA in a mole ratio range of about 2 to about 0.5.

A feed line 130 supplies the feed stream to the alkali metal-providing source 120. A conduit 140 is used to direct the feed stream from confined source 120 to reactor 100. The entire feed stream to reactor 100, or only a portion thereof, can be passed through the confined alkali metal source 120 prior to entering reactor 100. The temperature of the feed stream passing through the confined alkali metal source 120 is modulated to cause at least some of the alkali metal available from source 120 to leave the source-located carrier and enter the feed stream. At least a portion, and preferably most, of the alkali metal thus removed from the source-located carrier is entrained by the feed stream passing through source 120, and is transported to reactor 100. The entrainment and transport can be effected at a substantially uniform rate, or, if desired, periodically.

At least a portion, and preferably most, of the entrained alkali metal is deposited in a catalytically-active form on the catalyst support present in reactor 100, thereby extending or increasing the overall useful life of the catalyst present therein. Reaction product is withdrawn from reactor 100 via effluent line 144.

Control of the rate at which the alkali metal is released from source 120, as well as the amount released from source 120, can be effected by modulating the feed stream temperature passing through it. To modulate the temperature of the feed stream passing through source 120, a control unit 150 can be utilized in conjunction with heating/cooling unit 170 together with suitable inlet and outlet temperature-sensing transducers 153 and 155 that are respectively operably associated with control unit 150 by means of connections 152 and 154. In operation, the obtained information from transducers 153 and 155 can be utilized to adjust the temperature of the feed stream exiting source 120. The amount or concentration of alkali metal in the feed stream to reactor 100 can be monitored by a suitable substance-sensing transducer 157 separately connected to control unit 150 via sensing connection 156.

The temperature of the feed stream passing through source 120 also can be adjusted by a heat exchanger 160 that can be incorporated into feed line 130. In such an event, control unit 150, utilizing a control connection 162 operatively connecting control unit 150 with heat exchanger 160, controls the operation of the heat exchanger 160 so that the feed stream entering the confined source 120 is preheated to a desired temperature or within a desired temperature range. Alternatively, the amount of alkali metal entrained in the feed stream passing through the source 120 can be modulated by adjusting the composition and/or amount of the feed stream portion that passes through the source.

The carrier or substrate material for the alkali metal in confined source 120 can be a substantially inert material, or can be a catalyst support material of the same type used in reactor 100 as mentioned above. In particular, the source-contained carrier material can be alumina, titania, kieselguhr (diatomaceous earth), silica-alumina, silica gel, tin oxide, an ion-exchange resin, and the like, in particulate form.

Commercially available extrudates, granules, spheres, rings and pellets, varying in size from about 1/32 to about ¼ inches in diameter, as well as powders, are suitable for purposes of the present invention as the particulate support or carrier material.

The source-located alkali metal carrier is preferably a particulate siliceous material, such as silica gel. This siliceous support material in the confined source 120 can take the form of a relatively small bed of a relatively high surface area, commercially-available silica on which a catalytically-active substance such as cesium$^{+1}$ another suitable catalytically-active ingredient is present. The active catalytic ingredient usually is present in a relatively large amount, e.g., up to about 10 wt. %, or more, of active ingredient, based on the weight of the carrier plus active ingredient. However, silica having a relatively low surface area and, a relatively high alkali metal loading thereon can also be utilized as the alkali metal source.

The reactor-contained catalyst support can be an aluminosilicate (such as a naturally-available attapulgite or a synthetically-produced zeolite), a clay, or a siliceous material such as silica gel. The preferred reactor-contained support is particulate, porous silica gel.

The catalytically-active alkali metal is present on the reactor-contained catalyst support in the +1 oxidation state. Illustrative of alkali metal compounds that can be used to load the desired amount of alkali metal onto its desired support are sodium hydroxide, potassium hydroxide, rubidium hydroxide, cesium carbonate, and cesium hydroxide.

Preferably, the catalytically-active alkali metal is cesium, and thus is derived from a cesium compound that serves as catalyst precursor. The cesium compound can be a relatively volatile, a soluble, or a thermally decomposable substance.

Illustrative volatile cesium compounds include cesium dibromochloride ($CsBr_2Cl$), cesium formate [$Cs(CHO_2 \cdot H_2O)$], cesium hydrofluoride ($CsF \cdot HF$), cesium hydrogencarbide ($CsHC_2$), cesium hydroxide ($CsOH$), cesium pentaiodide ($CsI_5$), cesium triiodide ($CsI_3$), cesium hydrogen nitrate ($CsNO_3 \cdot HNO_3$), cesium dihydrogen nitrate ($CsNO_3 \cdot 2HNO_3$), cesium peroxide ($Cs_2O_2$), cesuyn trioxide ($Cs_2O_3$), cesium propionate [$Cs(C_3H_5O_2)$], and the like.

Illustrative thermally decomposable cesium compounds include cesium borofluoride ($CsBF_4$), cesium bromate ($CsBrO_3$), cesium bromochloride iodide ($CsIBrCl$), cesium dibromoiodide ($CsIBr_2$), cesium perchlorate ($CsClO_4$), cesium dichloroiodide ($CsICl_2$), cesium permanganate ($CsMnO_4$), cesium nitrate ($CsNO_3$), cesium oxide ($Cs_2O$), cesium phosphate ($Cs_3PO_4$) and the like.

Illustrative cesium compounds which are water soluble include cesium acetate [$Cs(C_2H_3O_2)$], cesium benzoate [$Cs(C_7H_5O_2)$], cesium monobromide ($CsBr$), cesium carbonate ($Cs_2CO_3$), cesium bicarbonate ($CsHCO_3$), cesium chlorate ($CsClO_3$), cesium chloride ($CsCl$), cesium chromate ($Cs_2CrO_4$), cesium fluoride ($CsF$), cesium fluorosilicate ($Cs_2SiF_6$), cesium formate [$Cs(CHO_2)$], cesium hydroxide ($CsOH$), cesium iodide ($CsI$), cesium nitrate cesium ($CsNO_3$), cesium oxalate [$Cs(C_2O_4)$], cesium salicylate [$Cs(C_7H_5O_3)$], cesium selenate ($Cs_2SeO_4$), cesium hydrogen tartrate [$CsH(C_4H_4O_6)$], and the like. The cesium compound can also be one that is soluble in a water-miscible or water-immiscible organic solvent.

Preferred are monovalent cesium compounds that are selected from the group consisting of cesium carbonate, cesium oxide, cesium hydroxide, cesium phosphate, cesium fluoride and cesium nitrate.

In operation, the feed stream containing the PA and FA reactants is passed through the source 120 usually at a temperature of about 400° F. (about 205° C.) to about 600° F. (about 315° C.), preferably about 475° F. (about 246° C.) to about 525° F. (about 274° C.) for a Cs-on-silica gel source. Alkali metal such as cesium$^{+1}$ is released from its source-contained carrier, entrained in the feed stream and deposited onto the reactor-contained catalyst support. The desired condensation reaction takes place in reactor 100, which reactor preferably is operated adiabatically. A product stream containing the desired product, MA, is withdrawn from reactor 100 via effluent line 144. In typical operation, the reactor effluent contains not only the desired synthesis product, MA, but also co-product water, as well as unconverted PA and FA reactants, a variety of organic by-products and certain relatively volatile gases.

While the contemplated condensation reaction may already begin as the feed stream passes through source 120, preferably the degree of the condensation reaction taking place within source 120 is minimized. One way of accomplishing this result is by utilizing a particulate carrier/alkali metal combination within source 120 that has minimal catalytic activity. Another way of accomplishing this is by passing through the confined source 120 only a portion of the reactants that comprise the feed stream, e.g., only propionic acid or primarily propionic acid with a relatively small amount of formaldehyde. Moreover, a relatively lower operating temperature in source 120 also can be used to minimize the degree of the condensation reaction taking place therein.

The alkali metal source 120 can be removed from the system, replenished, or replaced, whenever necessary, while the reactor 100 remains on stream. In addition, the flow of the feed stream through reactor 100 can be periodically reversed to redistribute within reactor 100 the catalytically-active material while source 120 is maintained upstream relative to reactor 100. As discussed more fully below, this feature of the present invention substantially reduces the frequency of shutdowns and reduces overall unscheduled downtime as well.

FIG. 2 illustrates another embodiment of the present invention. The system that is shown can be utilized to catalytically synthesize the desired unsaturated carboxylic acid in a series of staged adiabatic reactors while extending catalyst useful life. Specifically, a reactor system 200, comprising a pair of reaction vessels or reactors 201 and 203, is staged so that a portion of the desired reaction takes place in the upstream or first-stage reactor 201, with the remainder of the reaction taking place in the downstream or last-stage reactor 203. Preferably, each of reactors 201 and 203 is operated adiabatically, one independent of the other. However, isothermal operation of the reactors is also possible, if desired.

Staged operation of the reactor system 200 thus permits maintenance in each of the reactors 201 and 203 of the desired condensation reaction conditions that optimize the overall production of the desired product. Typically, in optimizing the overall conversion of reactant or reactants to product, the first-stage reaction vessel 201 is operated at an inlet temperature of about 530° F. (about 277° C.) to about 570° F. (about 300° C.); and the last-stage reaction vessel 203 is operated at a temperature of about 580° F. (about 305° C.) to about 620° F. (about 327° C.).

In a manner similar to the system shown in FIG. 1, the alkali metal source 220 is located upstream of the reactor system 200. In operation, the feed stream is introduced into the source 220 and is passed therethrough while the feed stream temperature is modulated, as discussed above, to effect entrainment of alkali metal from confined source 220 into the feed stream. The alkali metal-containing feed stream can then be passed first through the first-stage reactor 201, and thereafter through the last-stage reactor 203, as shown. Product can be withdrawn from the last-stage vessel 203. If desired, alkali metal source 220 can be omitted, in which event first-stage reactor 201 serves as the confined alkali metal source for reactor 203 as well.

Figure 3:
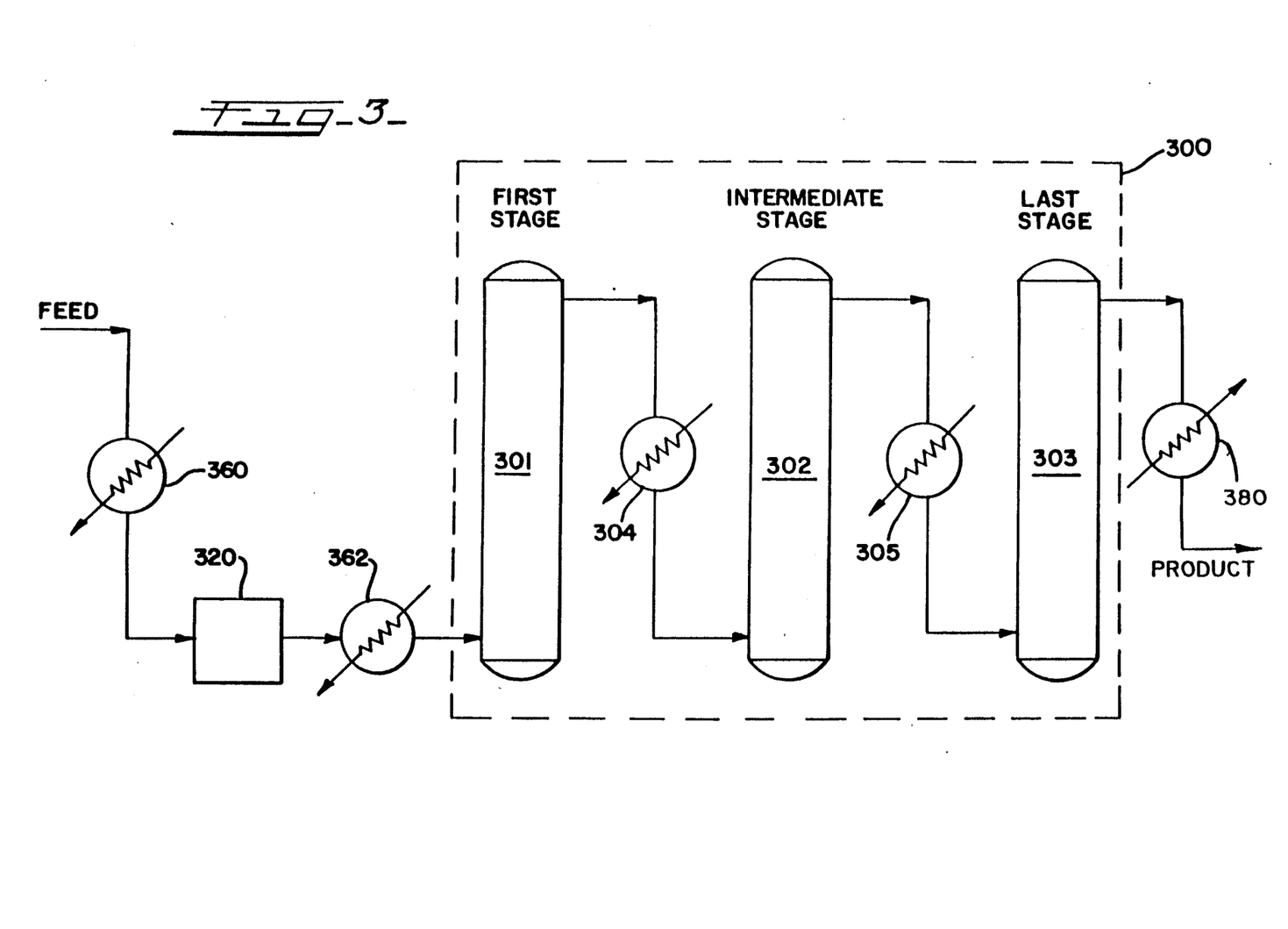
FIG. 3 is a schematic representation of yet another system embodying principles of the present invention; and, FIGS. 4a through 4i are schematic representations illustrating yet other embodiments of the present invention.

FIG. 3 illustrates yet another embodiment of the present invention that can be utilized to catalytically synthesize the desired unsaturated carboxylic acid product. A reactor system 300 is shown with three staged reactors 301, 302 and 303 that are operated adiabatically. This system also includes inter-stage heat exchangers 304 and 305 for temperature adjustment in the downstream reactors. In operation, the staged adiabatic reactor system 300 is characterized by an absence of substantial observable radial temperature gradients within each reactor and by a plug-flow type of flow pattern in each reactor. A plug-flow type of flow pattern is in contrast to the backmixing type of reactor-throughput pattern which is characteristic of a fluidized-bed type, of reaction vessel.

In the present instance, not only do reaction kinetics of gas-phase MA-synthesis favor a plug-flow reactor over a back-mix reactor, but the staging of the plug-flow reactors and the operation of these in an adiabatic manner permits optimization of the overall conversion of the feed to the desired product by enabling the selection for each reactor of a unique set of reaction conditions. Typically, the three staged adiabatic reactors shown in FIG. 3 are operated at reactor inlet temperatures of about 540° F. (about 282° C.), about 590° F. (about 310° C.), and about 610° F. (about 321° C.), respectively.

Upstream heat exchanger 360 is used to preheat the feed stream prior to its entering the confined alkali metal source 320. The staged adiabatic reactor system shown in FIG. 3 can also include an additional heat exchanger 362, located downstream of the alkali metal-supplying source 320, to permit further adjustment to be made to the feed stream temperature before the feed stream is introduced into the first-stage reactor 301. Also, if desired, a heat exchanger 380 can be provided downstream of the reactor system 300 for heat recovery or further product stream temperature adjustment.

In operation, the feed stream passes through upstream heat exchanger 360 which preheats the feed stream, if necessary. From heat exchanger 360, the feed stream is passed through the alkali metal source 320. Exiting confined source 320, the feed stream is passed through heat exchanger 362 which can supply heat to the feed stream as required. The temperature of the feed stream passing through the alkali metal source 320 can be modulated, as discussed above, to control the release and entrainment of the alkali metal therein. The alkali metal-containing feed stream is passed first through the first-stage reactor 301, then through the intermediate-stage reactor 302, and finally through the last-stage reactor 303. Most of the entrained, catalytically-active metal usually is deposited onto the catalyst support material located in the first-stage reactor 301; however, some deposit may be made in reactors 302 and 303 as well.

The present invention also provides an impurity-trapping feature. The reactor feed stream can contain a variety of impurities, some of which exhibit a tendency to change the nature of the active catalytic ingredient of the basic catalyst contained in the reaction vessels so as to lower selectivity toward production of the desired product. For example, the process stream usually contains iron, sometimes in an appreciable amount. The iron, and a few other impurities present in the feed stream supplied to the first-stage reaction vessel, in turn, are known to lower the selectivity of the catalyst contained therein.

However, the alkali metal source upstream from the first reactor is not only able to supply the alkali metal in a catalytically-active form to a preselected reaction vessel for the purpose of replenishing the catalyst contained therein, but the source also tends to trap undesirable impurities that are present as well. As a result, the feed stream is passed to the desired reaction vessel substantially depleted of these impurities. This results in an increase in catalyst useful life and performance.

As mentioned hereinabove, a catalyst-containing reactor can also function as an alkali metal source for reactors situated downstream therefrom. To this end, the upstream-most reactor can be operated to cause the chemical synthesis reaction to take place at a minimal or reduced rate over the catalyst bed that is contained in the source-reactor while effecting a desired alkali metal depletion for the benefit of the other reactors situated downstream therefrom. Moreover, in such cases, the alkali metal content in the catalyst bed of the upstreammost reactor can be replenished continuously, or periodically, by replacing at least a portion of the basic catalyst present while the particulate catalyst beds in the downstream reactors remain undisturbed. Such operation is also advantageous because the presence of water, which is a co-product of the MA-synthesis reaction as mentioned above, and which tends to damage some catalyst supports (e.g., siliceous catalyst supports) by undesirably affecting support physical properties such as porosity and surface area, is reduced. By minimizing the rate of reaction, and thereby minimizing the presence of water, the reuse of the alkali metal-depleted catalyst support in the alkali metal source or the first-stage reactor is possible.

Because the cost of replacing discarded catalyst support material is a substantial portion of total catalyst cost, this particular reuse feature of the present invention, which extends catalyst useful life, tends to reduce total cost of catalyst and reduces overall operating costs as well.

The overall reactor system performance is not undesirably affected by utilizing the first of a series of staged adiabatic reactors as the alkali metal source. Rather, such use results in enhanced overall catalyst performance.

FIGS. 4a through 4i show serial reactor arrangements which further illustrate the features of the present invention. These schematic drawings, presenting the series-connected reactors, illustrate sequential operation of staged reactors which can be operated in an adiabatic fashion. These schematics also illustrate certain preferred methods for removing a particular reactor from service for decoking purposes while maintaining substantially continuous production of the desired unsaturated carboxylic acid.

The reaction of PA and FA to methacrylic acid and water commonly produces tar and coke which are observed to deposit on the surfaces of the catalyst. These deposits, which range from rather flammable, relatively volatile tars to more intractable coke, are usually removed by burning off the deposits utilizing dilute air. A typical decoking cycle might comprise 48 hours on feed and may require 24 hours for decoking. Because it is undesirable to interrupt production rates, a variety of methods for redirecting individual process flow streams have been developed.

Figure 4A:
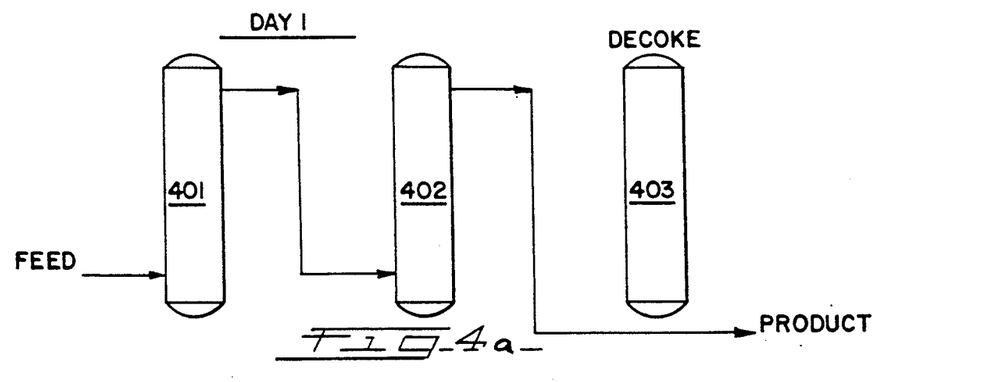
Figure 4B:
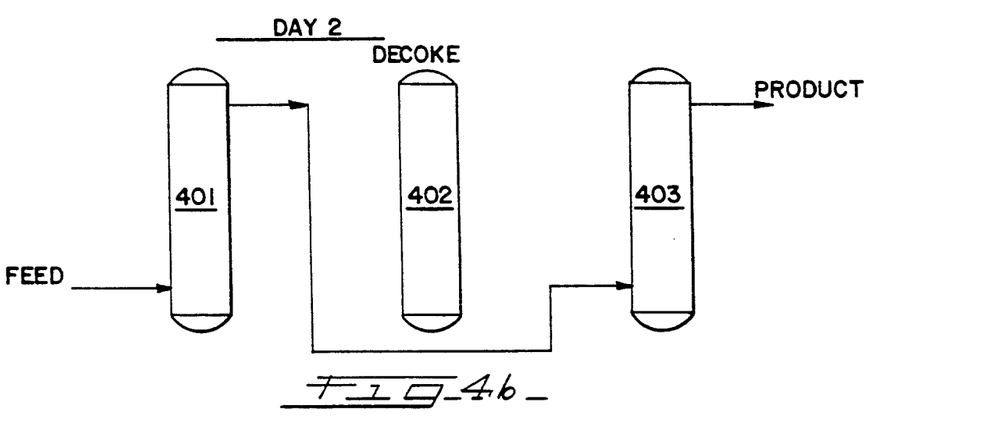
Figure 4C:
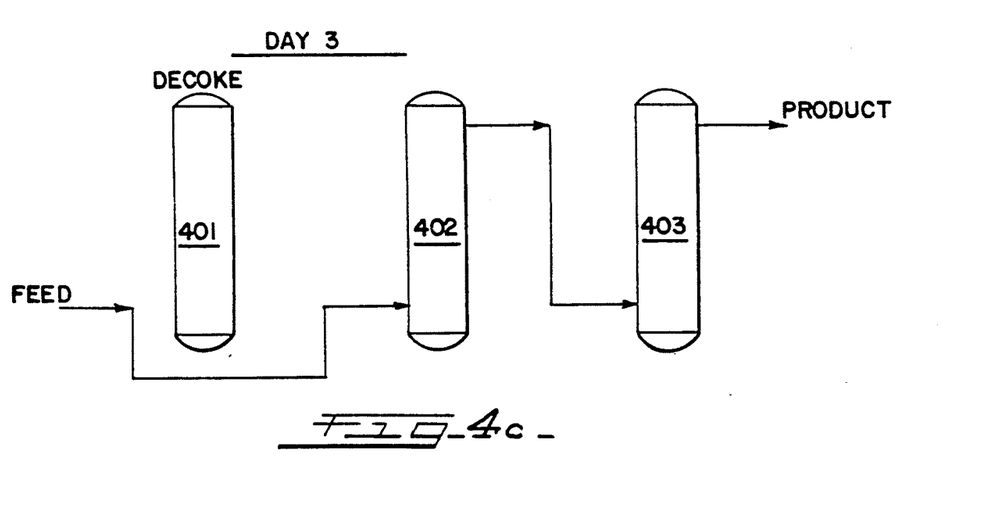

Specifically, FIG. 4a–4c illustrates one three-day operating cycle employing a reactor system comprising a series of three reactors 401, 402 and 403. This particular three-day cycle contemplates that each reactor is on feed for about 48 hours and is decoked for about 24 hours. On any given day, two of the reactors are operating in a staged fashion. More particularly, on the first day of a cycle (FIG. 1a) the feed is passed first through the first-stage reactor 401 and then through the intermediate-stage reactor 402, while the last-stage reactor 403 is being decoked. On the second day (FIG. 1b), the feed is serially passed first through the first-stage reactor 401 and then through the last-stage reactor 403 while the intermediate-stage reactor 402 is bypassed for decoking purposes.

Figure 4D:
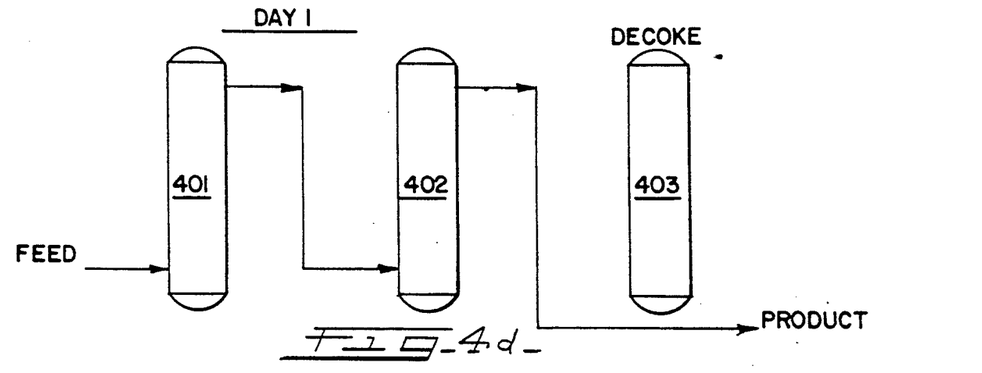
Figure 4E:
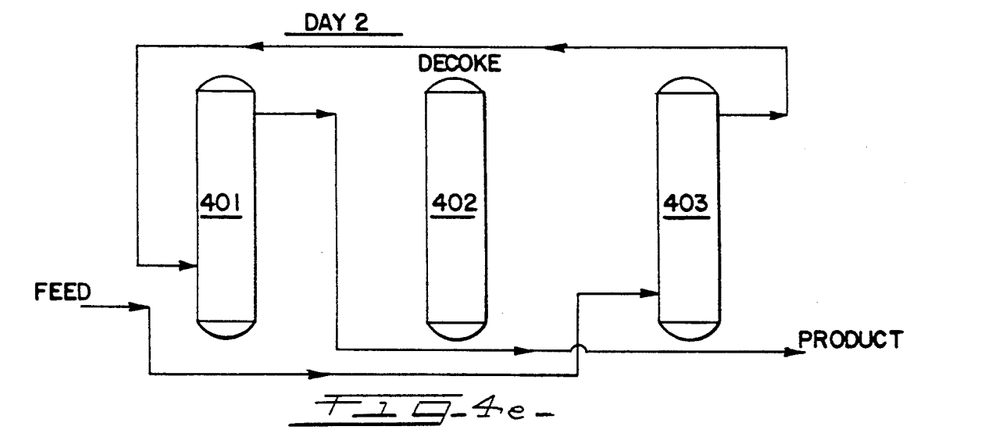
Figure 4F:
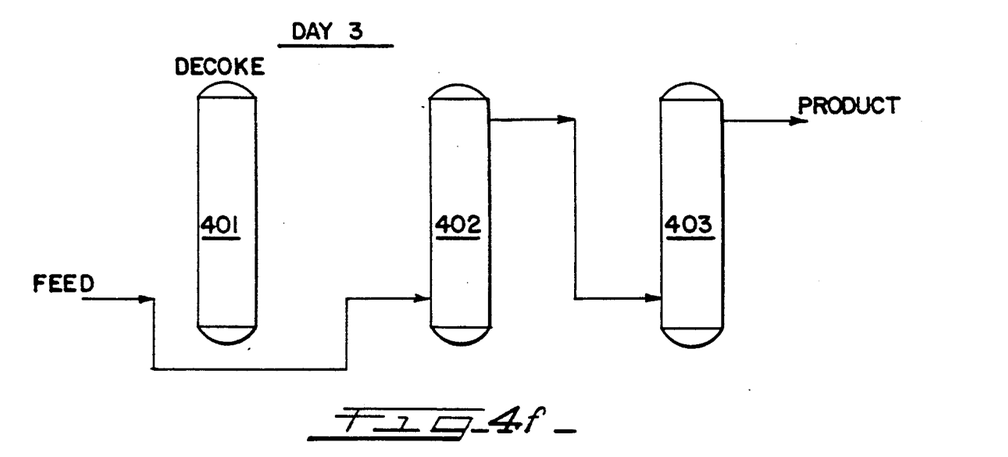

The illustrated reactor sequence is interchangeable. In particular, on the second day, the feed can be passed first through the last-stage reactor 403 and thereafter through the first-stage reactor 401, from which the desired product is discharged. This is shown in FIGS. 4d–4f. Another benefit of this particular expedient is that the available alkali metal is relatively evenly distributed among the several reactor stages. The three-day cycle is particularly preferred because each stage is the first stage for one day, the second stage for the next day, and then is in a "decoke" mode the following day. Thus, no single stage will gain or lose (on the average) more alkali metal than any other stage. However, an alkali metal source upstream of the staged reactors is still desirable to replace any net alkali metal loss that may occur. In any event, on the third day, the first-stage reactor 401 can be bypassed for decoking, while the feed is passed first through the intermediate-stage reactor 402 and thereafter through the last-stage reactor 403 to produce the desired product. As a result, sequential decoking of the reactors constituting the reaction system can be effected while the on-stream reactors continue to produce the desired product.

Thus, utilizing a reactor system comprising "n" staged reactors permits operation of the system on an "n"-day cycle, and on a substantially continuous basis. Furthermore, utilization of such a system permits operating "n-1" of the reactors in a staged manner while one of the "n" reactors is removed from service for decoking purposes, on a substantially continuous basis.

For example, a reaction system comprising four reactors could provide substantially continuous production if operating on a 4-day cycle. Such a system could be arranged so that the feed is serially passed through three of the four reactors while one of the reactors is removed from service for decoking purposes. Such a 4-reactor system, when the three in-service reactors are staged and operated adiabatically on a 4-day cycle, can be utilized to provide the adiabatic reactor system discussed above in connection with FIG. 3.

Figure 4G:
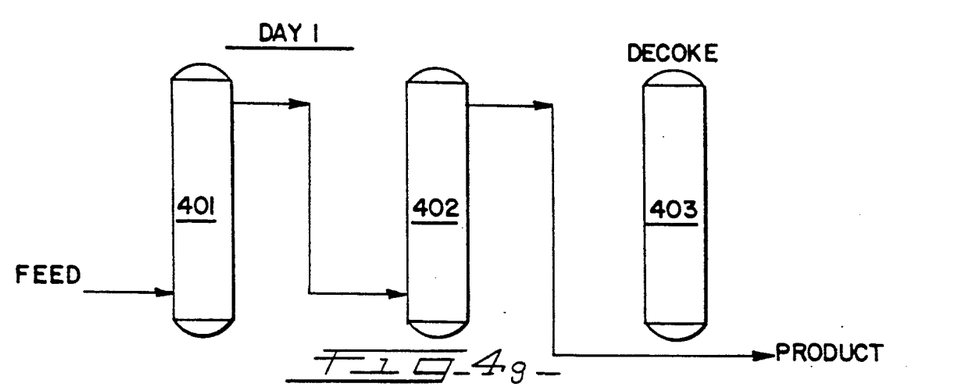
Figure 4H:
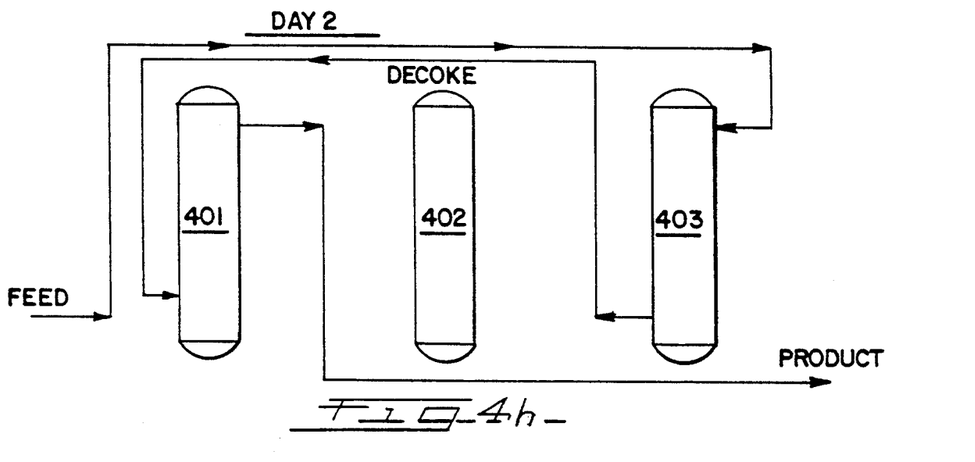
Figure 4I:
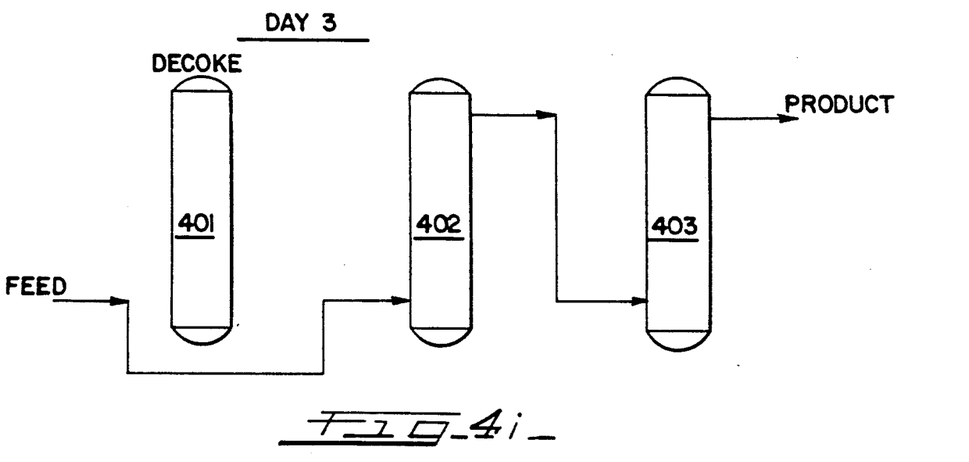

Still another feature of the present invention is the fact that flow of feed through a single reactor is reversible. This point is illustrated in FIGS. 4g–4i specifically in connection with operation of the last-stage reactor 403 on the second day. In this manner, the alkali metal catalyst can be redistributed within the same reactor as well as within the entire series of reactors.

The present invention is illustrated further by the following examples:

EXAMPLE 1

Continuous Production of Methacrylic Acid in the Staged, Adiabatic Reactor System Illustrated in FIG. 3

The process shown in FIG. 3 but without separate alkali metal source 320, i.e., with reactor 301 serving also as the cesium source, was operated at the following process conditions to synthesize methacrylic acid from condensation of PA with FA in the vapor phase:

Feed stream flow rate of 1.5 WHSV, hr.$^{-1}$;
First-stage reactor:

|  | 1st Day | 30th Day |
|---|---|---|
| inlet temperature | 530° F. | 600° F. |
| outlet temperature | 560° F. | 630° F. |

Intermediate-stage reactor:
 inlet temperature 590° F.
 outlet temperature 615° F.
Last-stage reactor:
 inlet temperature 610° F.
 outlet temperature 630° F.
Total days on feed since last catalyst reloading:

first-stage reactor: 30 days
intermediate-stage reactor: 120+ days
last-stage reactor: 120+ days
Overall selectivity to MA based on 30% conversion of PA was about 85 to about 90 mole %
Type of particulate alkali metal-bearing catalyst utilized was derived from Cs$_2$CO$_3$ on silica gel, about 20 to about 40 mesh (U.S. Sieve Series), and contained about 4 wt. % Cs
  First-stage reactor contained about 365 grams of about 4 wt. % Cs, based on weight of the catalyst
  Intermediate-stage reactor contained about 365 grams of about 4 wt. % Cs
  Last-stage reactor contained about 365 grams of about 4 wt. % Cs
PA/FA mole ratio in feed was about 3/2
First-stage reactor operating pressure was about 10 psig
Intermediate-stage reactor operating pressure was about 7 psig
Last-stage reactor operating pressure was about 4 psig
Overall system pressure drop was about 10 psi.

EXAMPLE 2

Utilization of Upstream-Most Reactor As Confined Catalyst Source for Downstream Reactors A series of three adiabatic reactors (Stages A, B and C), each containing a particulate bed of a Cs-on-silica gel catalyst containing about 4 weight percent cesium, was used to produce methacrylic acid by continuous vapor-phase condensation of propionic acid with formaldehyde at a constant feed composition. Reactor inlet temperatures and the temperature rise ($\Delta T$) across each reactor were monitored. The temperature rise across Stage A reactor was maintained at about 25° F.

After about 80 days of substantially steady reactor performance, the catalyst activity in Stage B reactor was observed to decline. Thereafter, the catalyst bed of Stage A reactor was replaced with particulate Cs-on-silica gel catalyst containing about 10 weight percent cesium. The catalyst activity in Stage B reactor was observed to increase almost immediately. Ten days thereafter catalyst activity in Stage B reactor was observed to be at about the same level as when Stage B was originally charged with fresh 4 wt. % cesium catalyst.

Reactor temperature profile for Stage B reactor one day before and one day after charging the Stage A reactor with the 10 wt. % cesium catalyst is set forth in Table I below:

TABLE I

| Location Along Reactor | One Day Before Charging | | One Day After Charging | | Net Temperature Difference, °F. |
|---|---|---|---|---|---|
| | T, °F. | $\Delta T$, °F. | T, °F. | $\Delta T$, °F. | |
| Inlet | 592 | | 592 | | |
| | | 2 | | 4 | +2 |
| Zone 1 | 594 | | 596 | | |
| | | 3 | | 8 | +5 |
| Zone 2 | 597 | | 604 | | |
| | | 5 | | 7 | +2 |
| Zone 3 | 602 | | 611 | | |
| | | 4 | | 6 | +2 |
| Zone 4 | 606 | | 617 | | |
| | | 2 | | 3 | +1 |
| Outlet | 608 | | 620 | | |

TABLE I-continued

| Location Along Reactor | One Day Before Charging | | One Day After Charging | | Net Temperature Difference, °F. |
|---|---|---|---|---|---|
| | T, °F. | $\Delta T$, °F. | T, °F. | $\Delta T$, °F. | |
| | | 16 | | 28 | +12 |

The performance of the recharged Stage A reactor leveled out after twenty-one days on feed since recharging at a $\Delta T$ value of about 20° to 25° F. at a somewhat elevated Stage A reactor inlet temperature of about 610° F.

The overall conversion/selectivity performance for these staged adiabatic reactors during this time period was about 33% PAC and about 82% PAS.

The foregoing data illustrates the feasibility of rejuvenating a catalyst bed from an upstream, confined catalyst source during a continuous reactor operation.

What has been illustrated and described herein is a novel method for extending catalyst useful life. While the method of the present invention has been illustrated and described with reference to a number of preferred embodiments, the present invention is not limited thereto. On the contrary, alternatives, changes or modifications will become apparent to those skilled in the art upon reading the foregoing description. For example, as discussed above, it can be appreciated that the flow of feed being directed to any one reactor of a reactor system comprising a plurality of reactors can be suitably piped so as to be redirected from the one reactor to any one of the other reactors, i.e., can be interchanged among the reactors, for maintaining substantially uniform distribution of available alkali metal, such as cesium, between the reactor stages. Likewise, the feed flow through any one of a series of staged reactors can be reversed so as to maintain substantially uniform alkali metal distribution in that stage. Accordingly, such alternatives, changes and modifications are to be considered as forming a part of the invention insofar as they fall within the spirit and scope of the appended claims.

We claim:

1. A method for producing methacrylic acid by the condensation of propionic acid with formaldehyde in the presence of a particulate, basic catalyst constituted by a alkali metal in the +1 oxidation state and a porous, siliceous support therefor, which method comprises providing at least two adiabatic reactors in series containing said basic catalyst in particulate form wherein the upstream-most one of said at least two reactors is used as an alkali metal source, passing a feed stream containing said propionic acid first through said upstream-most one of said at least two adiabatic reactors and then through the remaining adiabatic reactors while maintaining condensation conditions in said remaining reactors, and transporting at least some of said alkali metal from said upstream-most one of said at least two adiabatic reactors to said basic catalyst contained in said remaining adiabatic reactors.

2. The method in accordance with claim 1 wherein at least a portion of said alkali metal in said upstream-most one of said at least two adiabatic reactors is replenished periodically.

3. The method in accordance with claim 1 wherein said upstream-most one of said at least two adiabatic reactors contains a porous, packed bed having a surface area and alkali metal content greater than the surface area and alkali metal content of said particulate basic catalyst present in said remaining adiabatic reactors.

4. The method in accordance with claim 1 wherein said transporting is effected at a substantially uniform rate.

5. The method in accordance with claim 1 wherein said transporting is effected periodically.

6. The method in accordance with claim 1 wherein said alkali metal is cesium.

7. In a process for producing methacrylic acid by the condensation of propionic acid with formaldehyde in the presence of a basic catalyst comprising a porous siliceous catalyst support and an alkali metal in the +1 oxidation state on the surface of said siliceous catalyst support, the improvement for extending catalyst useful life comprising:
providing at least one downstream reactor containing said basic catalyst in particulate form;
providing an upstream reactor containing a source of said alkali metal on a particulate carrier upstream of said at least one downstream reactor;
passing at least a portion of a reactant feed stream containing propionic acid through said upstream reactor and thereafter through said at least one downstream reactor while maintaining condensation reaction conditions in said upstream and at least one downstream reactor; and
modulating the temperature of said feed stream portion passing through said upstream reactor to cause at least some of said alkali metal present in said upstream reactor to commingle therewith and be deposited in said at least one downstream reactor.

8. The method in accordance with claim 7 wherein the alkali metal is cesium.

9. In a process for producing methacrylic acid by the condensation of propionic acid with formaldehyde in the present of a basic catalyst comprising a porous siliceous catalyst support and an alkali metal in the +1 oxidation state on the surface of said siliceous catalyst support, the improvement for extending catalyst useful life comprising:
providing a reactor system comprising a plurality of staged adiabatic reactors each containing said basic catalyst in particulate form;
providing a confined source of said alkali metal on a particulate carrier upstream of said reactor system;
passing at least a portion of a reactant feed stream through said alkali metal source and thereafter through said reactor system while maintaining condensation reaction conditions in said reactor system;
modulating the temperature of said reactant feed stream portion passing through said alkali metal source to cause at least some of said alkali metal present in said source to commingle therewith;
introducing into said reactor system the alkali metal bearing portion of said reactant feed stream such that alkali metal is deposited in said plurality of staged adiabatic reactors of reactor system; and
interchanging the feed flow among said plurality of staged adiabatic reactors to adjust distribution of available alkali metal therein.

10. The process in accordance with claim 9 wherein the alkali metal is cesium.

11. The process in accordance with claim 10 wherein said feed flow through at least one of said plurality of staged adiabatic reactors is reversed at the feed flow among said staged adiabatic reactor is interchanged.

12. In a process for producing methacrylic acid by the condensation of propionic acid with formaldehyde in the presence of a basic catalyst comprising a porous siliceous catalyst support and an alkali metal in the +1 oxidation state on the surface of said siliceous catalyst support, the improvement for extending catalyst useful life comprising:
providing a reactor system comprising a plurality of staged adiabatic reactors each containing said basic catalyst in particulate form, the upstream-most of said staged adiabatic reactors serving as a confined source of the alkali metal for the remainder of said adiabatic reactors;
passing at least a portion of a reactant feed stream first through said alkali metal source and thereafter through the remainder of said staged abiabatic reactors while maintaining condensation reaction conditions in said staged adiabatic reactors;
modulating the temperature of said feed stream portion passing through said source to cause at least some of said alkali metal present in said source to commingle therewith;
introducing into the remainder of said staged adiabatic reactors the alkali metal bearing portion of the feed stream; and
interchanging the feed flow among said staged adiabatic reactors so as to adjust distribution of alkali metal therein.

13. The process in accordance with claim 12 wherein said alkali metal is cesium.

14. The process in accordance with claim 13 wherein said reactant feed stream flow through said reactor system is periodically reversed.

* * * * *

UNITED STATES PATENT AND TRADEMARK OFFICE
CERTIFICATE OF CORRECTION

PATENT NO. : 5,241,114
DATED : August 31, 1993
INVENTOR(S) : Thomas G. Smith, et al.

It is certified that error appears in the above-identified patent and that said Letters Patent is hereby corrected as shown below:

On the title page:

Item: [63] under Related U.S Application Data [63] reads "Continuation-in-part of Ser.No. 946,986, Dec. 29, 1986, Pat. No. 4,943,659, which is a continuation of Ser. No. 785,326, Oct. 7, 1985, abandoned, which is a continuation..." should read --Continuation-in-part of Ser. No. 785,325, Oct. 7, 1985, Pat. No. 4,631,264, which is a division....--

Column 1  5-9  reads "This case is also a continuation-in-part of U.S. Ser. No.946,986, filed Dec. 29, 1986,now U.S. Pat. No.4,943,659, which is a continuation of U.S Ser. No. 785,326,filed Oct. 7, 1985 and now abandoned, which is a continuation...." should read --This case is also a continuation-in-part of Ser. No. 785,325, Oct. 7, 1985, Pat. No. 4,631,264, which is a division... --

Signed and Sealed this

Twenty-fourth Day of March, 1998

Attest:

BRUCE LEHMAN

Attesting Officer    Commissioner of Patents and Trademarks